(12) United States Patent
Qumsiyeh

(10) Patent No.: US 8,711,448 B1
(45) Date of Patent: Apr. 29, 2014

(54) LINEAR BOOK SCANNER

(75) Inventor: Dany Qumsiyeh, San Francisco, CA (US)

(73) Assignee: Google Inc., Mountain View, CA (US)

( * ) Notice: Subject to any disclaimer, the term of this patent is extended or adjusted under 35 U.S.C. 154(b) by 306 days.

(21) Appl. No.: 13/267,820

(22) Filed: Oct. 6, 2011

(51) Int. Cl.
*H04N 1/04* (2006.01)
*H04N 1/00* (2006.01)

(52) U.S. Cl.
USPC ........... 358/496; 358/474; 358/408; 358/482; 358/483

(58) Field of Classification Search
USPC ......... 358/474, 408, 488, 486, 483, 482, 496, 358/505, 514; 250/234–236, 216, 239; 382/312, 318, 319
See application file for complete search history.

(56) References Cited

U.S. PATENT DOCUMENTS

| | | | | |
|---|---|---|---|---|
| 5,640,252 | A * | 6/1997 | Turner et al. | 358/497 |
| 5,847,846 | A * | 12/1998 | Wu et al. | 358/475 |
| 6,056,258 | A * | 5/2000 | Swartz et al. | 248/455 |
| 6,574,014 | B2 * | 6/2003 | Sollitt et al. | 358/474 |
| 7,268,923 | B2 * | 9/2007 | Schroath et al. | 358/474 |
| 7,508,978 | B1 | 3/2009 | Lefevere et al. | |
| 7,557,965 | B2 * | 7/2009 | Taylor et al. | 358/474 |
| 7,586,655 | B1 * | 9/2009 | Uhlik et al. | 358/497 |
| 7,595,915 | B2 * | 9/2009 | Belkhir | 358/474 |
| 7,605,844 | B1 * | 10/2009 | Page et al. | 348/207.99 |
| 7,639,406 | B1 * | 12/2009 | Proudfoot et al. | 358/474 |
| 8,154,775 | B2 * | 4/2012 | Jeong et al. | 358/474 |

OTHER PUBLICATIONS

DIY Book Scanning "Welcome to DIY Book Scanner," 2 pages, [online] [retrieved on Oct. 24, 2011] Retrieved from the Internet <URL:http://www.diybookscanner.org/>.
Kirtas Technologies, "Kirtas Technologies Products," 2010, 1 page, [online] [retrieved on Oct. 24, 2011] Retrieved from the Internet <URL:http://www.kirtas.com/products.php>.
Plustek, "OpticBook 4800," 2010, 2 pages, [online] [retrieved on Oct. 24, 2011] Retrieved from the Internet <URL:http://plustek.com/usa/products/opticbook-series/opticbook-4800-usa//introduction.html>.
Qidenus Technologies, "QiScan-Automatic Book Scanner RBS TT," 2011, 1 page, [online] [retrieved on Oct. 24, 2011] Retrieved from the Internet <URL:http://www.roboticbookscan.com/>.
Treventus, "ScanRobot® 2.0 MDS," 2010, 2 pages, [online] [retrieved on Jan. 31, 2012] Retrieved from the Internet <URL:http://www.treventus.com/bookscanner_pageturner.html>.

* cited by examiner

*Primary Examiner* — Cheukfan Lee
(74) *Attorney, Agent, or Firm* — Fenwick & West LLP

(57) ABSTRACT

A linear scanning apparatus for scanning a bound volume is used to turn a page of the volume and scan the respective sides of the turned page. The apparatus includes front and rear portions, each having first and second support surfaces, to support the volume. As the volume moves along the linear scanner from the front portion to the rear portion, the page encounters a front guiding surface joined with the first front support surface that guides the page into a page turning channel within the linear scanner. As the volume continues to move along the linear scanner, an exit surface joined with the second rear support surface guides the page out of the page turning channel and onto the second rear support surface. Scanning devices disposed on the linear scanner digitally scan the sides of the page as the volumes moves along the linear scanner.

27 Claims, 6 Drawing Sheets

LINEAR BOOK SCANNER

BACKGROUND

1. Field of Art

The invention generally relates to the field of optical scanners and more specifically to an apparatus for scanning bound volumes such as books.

2. Background Information

Scanning printed material such as books, magazines, and other documents into digital form has become common with the advent of improved imaging, storage and distribution techniques. Although many types of unbound printed material can generally be scanned with relative ease using automatic page-feeding mechanisms such as those commonly found on digital copiers and scanners, bound volumes present additional challenges.

Various mechanisms have been developed to enable scanning of bound volumes. For example, a traditional flat-bed platen scanner typically scans one or two page-sides of bound volumes in a face-down position. However, for best results, a flat-bed scanner typically requires the application of force to the spine or binding of the volume to insure that the face-down pages come within the scanner's depth of field. Such force can damage the binding. In addition, using the flat-bed platen scanner is a tedious and time-consuming process as the pages typically must be manually manipulated and the bound volume correctly repositioned after each page is scanned. Further, image quality is often poor due to loss of focus or contact with the scanning surface, uneven illumination, and distortion caused by page curvature in the vicinity of the binding. Other mechanisms, such as face-up scanners, typically still require tedious manual manipulation of the pages into position and, if automated, are excessively complex and cost prohibitive.

SUMMARY

The above-mentioned and other problems are addressed by a linear scanner for scanning a page of a bound volume and a method of scanning a page of a bound volume using a linear scanner. An embodiment of the linear scanner includes a front portion having first and second front support surfaces disposed to support the volume as the volume moves along the linear scanner. The linear scanner also includes a front guiding surface joined with the first front support surface and disposed to guide the page of the volume into a page turning channel within the linear scanner as the volume moves along the linear scanner. Additionally, a rear portion of the linear scanner having first and second rear support surfaces respectively aligned with the first and second front support surfaces is disposed to support the volume as the volume moves along the linear scanner. The linear scanner also includes an exit surface joined with the second rear support surface and disposed to guide the page of the volume out of the page turning channel and onto the second rear support surface as the volume moves along the linear scanner. First and second scanning devices respectively disposed on one of the first support surfaces and one of the second support surfaces are adapted to digitally scan the page of the volume as the volume moves along the linear scanner.

The method of scanning a page of a bound volume using the linear scanner includes moving the volume along a front portion of the linear scanner having first and second front support surfaces to cause the page to encounter a front guiding surface joined with the first front support surface which guides the page of the volume into a page turning channel within the linear scanner. Further, moving the volume along the front portion past the channel to a rear portion of the linear scanner having first and second rear support surfaces respectively aligned with the first and second front support surfaces to cause the page to encounter an exit surface joined with the second rear support surface which guides the page out of the page turning channel and onto the second rear support surface. Additionally, movement of the volume along the linear scanner causes the page to encounter first and second digital scanning devices respectively disposed on one of the first support surfaces and one of the second support surfaces.

Another embodiment of the linear scanner includes a front portion having first and second front support means for supporting a bound volume as the volume moves along the linear scanner. The linear scanner also includes front guiding means for guiding the page of the volume into a page turning channel within the linear scanner as the volume moves along the linear scanner. Additionally, the linear scanner includes a rear portion having first and second rear support means respectively aligned with the first and second front support means for supporting the volume as the volume moves along the linear scanner. The linear scanner also includes exit means for guiding the page of the volume out of the page turning channel and onto the second rear support means as the volume moves along the linear scanner. First and second scanning means respectively disposed on one of the first support means and one of the second support means for digitally scanning the page of the volume as the volume moves along the linear scanner.

DETAILED DESCRIPTION

The following description is presented to enable any person skilled in the art to make and use the invention. The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures.

Operational Overview

Figure 1:
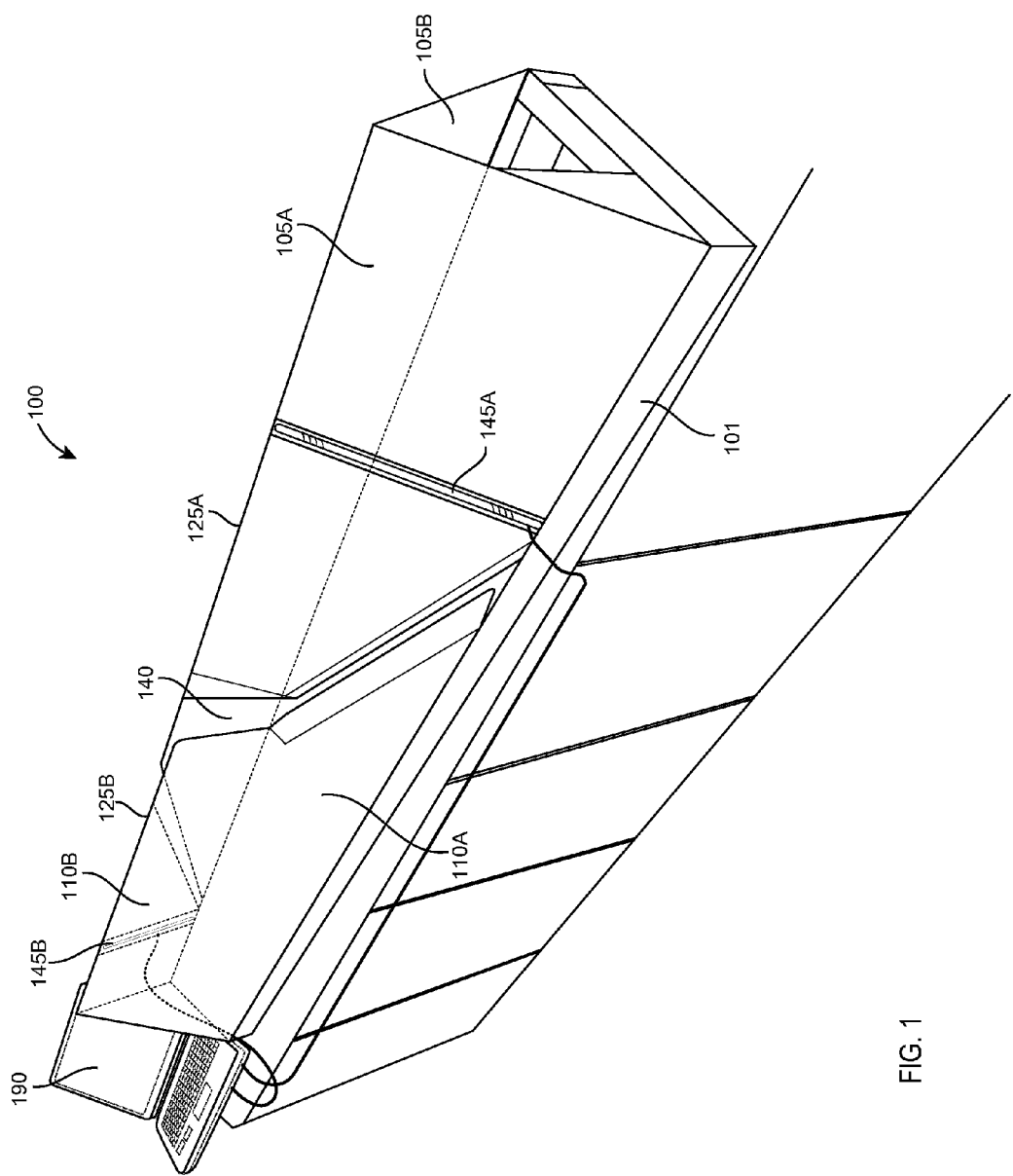
FIG. 1 is a schematic diagram illustrating a scanning apparatus according to one embodiment.

FIG. 1 is a schematic diagram illustrating a scanning apparatus 100 according to one embodiment. Structurally, the apparatus 100 includes a base 101 and front 105A, 105B and rear 110A, 110B support surfaces (also referred to herein as front 105 and rear 110 support surfaces, respectively, or collectively as support surfaces 105, 110 for clarity) which are affixed to the base. In one embodiment, the support surfaces 105, 110 are planes created out of, or coated with, a non-abrasive material with a low coefficient of friction. For example, the support surfaces 105, 110 can be constructed out of stainless steel, aluminum or plastic, and/or coated with a polymer such as high-density polyethylene. In some embodiments, one or more of the support surfaces 105, 110 and apexes 125A, 125B include mounted guide rails or rollers. For example, the apparatus 100 may be a wireframe with guide rails spanning the length of support surfaces 105, 110 and apexes 125A, 125B or rollers mounted vertically in the plane of support surfaces 105, 110.

In one embodiment, front support surface 105A is aligned with rear support surface 110A on a first side of the apparatus 100 and front support surface 105B is aligned with rear support surface 110B on a second side. The support surfaces 105A, 110A are arranged with support surfaces 105B, 110B, respectively, in a substantially triangular configuration and thus form a triangular prism having aligned front and rear portions. As shown, the front support surfaces 105A, 105B are joined and the rear support surfaces 110A, 110B are likewise joined to respectively form the apexes 125A, 125B that respectively extend linearly from the front and the rear of the scanning apparatus 100. Additionally, the front support surfaces 105 and rear support surfaces 110 are separated by a page turning channel 140. Likewise, embodiments include apexes 125A, 125B that are separated by the page turning channel 140 but overlap at the channel to form an apex 125 that extends the length of the scanning apparatus 110. The channel 140 is defined by gaps in the support surfaces 105, 110 and a path through the interior of the apparatus 100 that extends from a gap on a first side of the scanning apparatus 100, through the interior of the apparatus, to a gap on the second side of the apparatus. Scanning devices 145A, 145B are respectively located on opposite front 105A and rear 110B support surfaces facing outward.

In use, a bound volume is placed on the scanning apparatus such that the spine of the volume rests on the front apex 125A and the pages fall on either or both sides of the front support surfaces 105A, 105B. The bound volume is moved from the front portion of the apparatus 100 toward the rear portion while the spine remains in contact with the apex 125. As the volume travels along the apparatus 100, a page of the volume facing the front support surface 105A is scanned as it passes over the front scanning device 145A. In addition, the volume passes over the channel 140, which guides the scanned page from the front support surface 105A through the interior of the apparatus to the rear support surface 110B on the opposite side of the apparatus. The page is then scanned as it passes over the rear scanning device 145B. That is, the channel 140 essentially turns the page of the volume so that a page resting on one side of the apparatus 100 on the front support surface 105A prior to transitioning in the channel 140 rests on the opposite side on the rear surface 110B after the transition. The page guided by the channel 140 is therefore referred to herein as the "turned" page.

The scanning devices 145A, 145B scan the two sides of the turned page to form captured image data. The captured image data are received by a computer 190 and stored by a non-transitory storage device. The computer 190 includes one or more processors for processing the captured image data to render scanned pages. The computer 190 compounds the pages into a digital volume for purposes such as building a digital library. The apparatus 100 thus allows for efficient scanning of bound volumes.

Many variations of the embodiment of the apparatus 100 described above are possible. For example, the angle of the apex 125 formed by the joined support surfaces 105, 110 can vary depending upon the types of volumes being scanned. In one embodiment, the angle of the apex 125 and position of the support surfaces 105, 110 are designed to best allow the turned page of the volume facing the support surfaces 105, 110 to lay flat while moving over the scanning devices 145. As the angle decreases, the weight of the volume supported by the apex 125 increases. If the angle is too small, movement of the volume may be difficult and potentially damage the volume. Additionally, the smaller angle of the apex 125 can restrict the position of a given size of scanning devices 145 near the apex 125, thus leading to sub-optimal scanning near the binding of the volume. If the angle is too large, the pages may push the spine of the book away from the apex 125. At either extreme, image data can be lost due to sub-optimal scanning. In one embodiment, the angle is 60 degrees. Furthermore, in some embodiments, the apparatus 100 may be tilted to shift weight supported by the apex 125 and support surfaces on one side (105B and 110B or 105A and 110A) to support surfaces on the other.

Furthermore, embodiments of the apparatus include digital scanning devices 145 in alternative positions or orientations and alternative positions of the channel entrance and exit. For example, an apparatus may be implemented as a mirror image of apparatus 100 in FIG. 1, thus allowing alternate orientations of the volume on the apparatus. In addition, the scanning device 145 positions and orientations on the apparatus 100 may be varied to account for the type of scanning devices used, calibration procedures associated with the type scanning device used, desired length of apparatus or shifting of the page as it moves along the apparatus. One example includes scanning devices 145 positioned diagonally on the apparatus 100 extending from the apex 125 to the base 101. In another example, the scanning devices 145 are positioned on each side of the apparatus and meet at the apex 125 to capture page side scans or calibrate scanning devices simultaneously. Thus, for example, scanner 145B may be positioned on front support surface 105B. Alternatively, scanner 145A may be positioned on rear support surface 110B. In the example where the scanners 145A, 145B are positioned on front support surfaces 105A, 105B, respectively, each scanner 145 captures a side of two different pages (e.g. the page sides facing the support surfaces 105) to form the collected image data. Moving the volume over the channel 140 turns the page facing support surface 105A to expose new page sides for scanning.

In one embodiment, the scanning devices 145 are contact image sensors (CIS). In another embodiment, the scanning devices 145 are charge coupled devices (CCD). The type of scanning device used may depend on the angle of the apex 125 and geometry of the scanning device. For example, a CIS device may be rectangular and not reach the apex 125 when positioned vertically. In one embodiment, the scanning devices 145 are CCD devices with trapezoidal geometry.

Channel Entrance Side View

Figure 2:
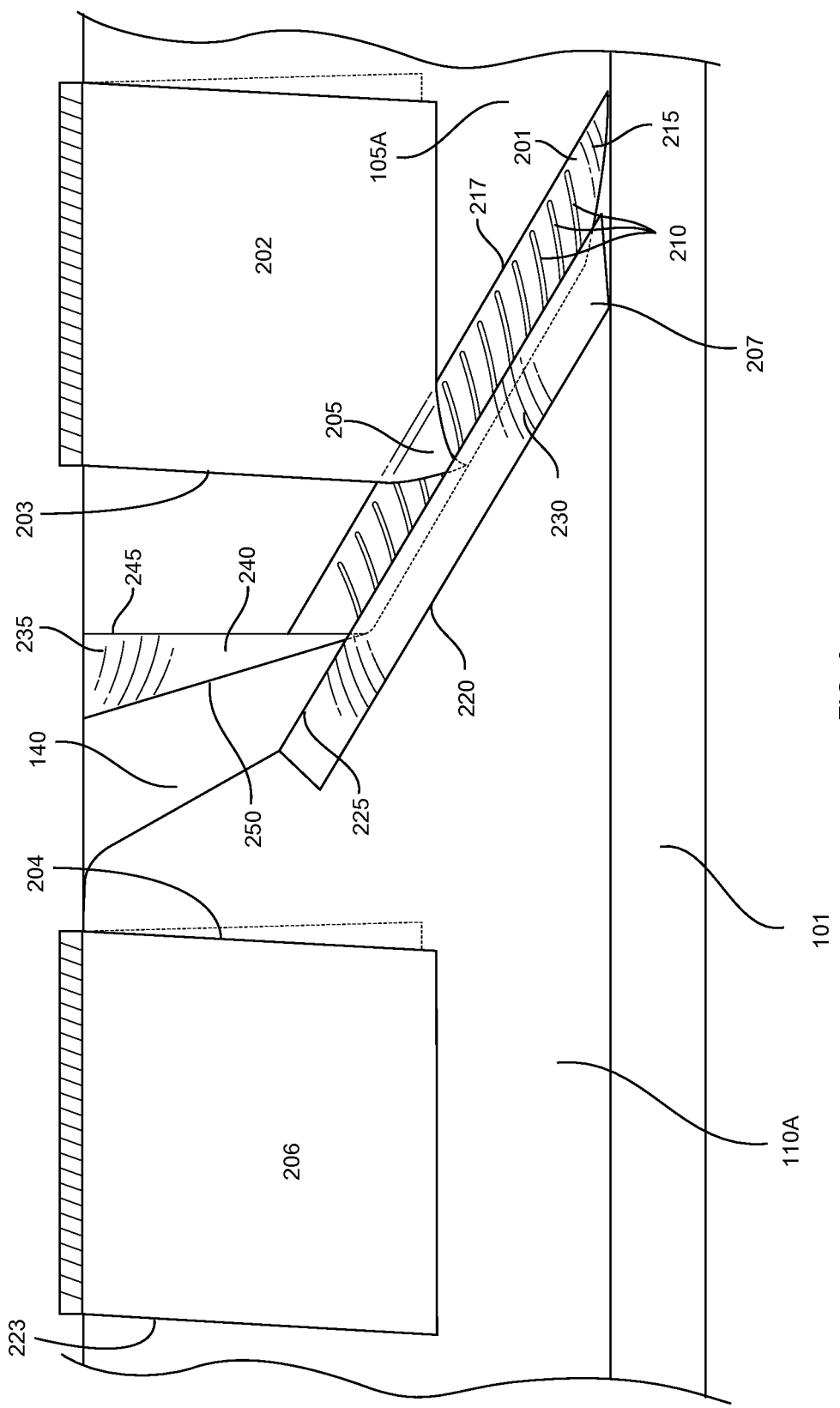
FIG. 2 is a schematic diagram illustrating a side view of the entrance to the page turning channel according to one embodiment.

FIG. 2 is a schematic diagram illustrating a side view of the entrance to the page turning channel 140 according to one embodiment. Some elements of the apparatus 100 are omitted in FIG. 2 for clarity. FIG. 2 illustrates the apparatus having a front guiding surface 201 joined with the front support surface 105A and a rear guiding surface 207 joined with the rear support surface 110B. The guiding surfaces 201, 207 include features 210, 215, 225, 230 to manipulate the turned page 202 of the volume into the channel 140 and away from the next page 206 of the volume.

As the volume moves from the front portion of the apparatus 100 toward the channel 140 entrance, the corner 205 of the turned page 202 encounters the front guiding surface 201. In one embodiment, the front guiding surface 201 includes perforations 210 and a surface geometry 215 that work in concert to separate the corner 205 of the turned page 202 away from the next page 206. The perforations 210 allow for use of negative air pressure to generate a force of sufficient strength to hold the corner 205 against the front guiding surface 201 while allowing the turned page 202 to slide over the front support surface 105A. The air pressure holds the corner 205 against the front guiding surface 201 until the leading edge 203 of the turned page 202 enters the portion of the channel 140 behind the rear guiding surface 207.

In one embodiment, the air flows from the outside environment through the perforations 210 into a chamber (not shown) behind the front guiding surface 201. The chamber is vacuumed to establish a pressure differential between the outside environment and the chamber. Thus, when the corner 205 of the turned page 202 slides over the perforations 210, the pressure differential holds the corner 205 against the surface 201.

In one embodiment, the front guiding surface 201 gradually curves into the channel 140. This way, as the air pressure due to the perforations 210 holds the corner 205 against the front guiding surface 201, the surface geometry 215 of the front guiding surface 201 gradually pulls the turned page 202 away from the next page 206 as the volume moves along the apparatus 100. As the volume continues to move, the corner 205 of the turned page 202 separates from the next page 206. The leading edge 203 of the corner 205 is released to move freely in the channel 140 after sliding past the perforations 210 and behind the rear guiding surface 207. The rear guiding surface 207 isolates the turned page 202 from the next page 206 and prevents the turned page 202 from leaving the channel 140.

The surface geometry 215 of the front guiding surface 201 may vary in different embodiments. For example, the area or distance over which the perforations 210 hold the turned page 202 against the front guiding surface 201 may vary to control the distance over which the guiding surface pulls on the page corner 205 and separates the corner from the next page 206. Likewise, the curvature of the surface geometry 215 may vary. The more extreme the curvature, the greater the separation of the corner 205 from the next page 206. However, as the curvature increases, so does the force needed to hold the corner 205 against the surface geometry 215 when the corner passes over the junction 217 where the front guiding surface 201 bends. If the curvature is too extreme, the air pressure will either not hold the turned page 202 against the front guiding surface 201 or the generated force needed to initially grab hold of the turned page will hold the page too firmly. If the force is too strong, the turned page 202 will not slide smoothly over the front guiding surface 201 and the leading edge 203 of the page may tear. Alternatively, if the curvature is too small, the next page 206 may stick to the turned page 202 and not separate. The perforations 210, surface geometry 215 and vacuum strength of the apparatus 100 are thus variable to compensate for volumes with differing page weights and construction. In some embodiments, the surface geometry 215, perforations 210 and vacuum strength are tuned for a specific type, weight or size of page and volume.

As the volume moves from the front portion of the apparatus 100 over the channel 140, the next page 206 encounters the rear guiding surface 207 which guides the next page 206 onto rear support surface 110A and isolates the turned page 202 in the channel 140. The rear guiding surface 207 extends from a junction 220 with the rear support surface 110A across the channel 140 entrance towards the front guiding surface 201. As shown in FIG. 2, the rear guiding surface 207 includes a separation edge 225 positioned above the perforated section 210 of front guiding surface 201. This position prevents the turned page 202 from leaving the channel 140 as the perforations 210 release the leading edge 203 of the page.

The rear guiding surface 207 also includes surface geometry 230 that guides the next page 206 onto the rear support surface 110A. For example, FIG. 2 illustrates the rear guiding surface 207 bent inward at the junction 220 from the plane of the rear support surface 110A into the channel 140. As the volume moves over the channel 140, the surface geometry 230 causes the next page 206 to slide onto the rear support surface 110A. The turned page 202, which is held against front guiding surface 201, slides unhindered underneath the separation edge 225 into the channel 140. Thus, the surface geometry 230 of the rear guiding surface 207 allows only the turned page 202 to enter the channel 140.

In practice, the leading edge 223 of the next page 206 may droop into the channel 140 entrance due to gravity, the force of additional pages in the volume, or due to sticking with the turned page 202. Accordingly, an embodiment of the surface geometry 230 angles the rear guiding surface 207 inward to position the separation edge 225 between the front guiding surface 201 and the plane of the support surfaces 105A, 110A. If the position of the separation edge 225 exceeds the maximum droop of the leading edge 233 of the next page 206 into the channel 140, it prevents the next page 206 from entering the channel 140 while allowing the turned page 202 to enter.

Once the turned page 202 enters the channel 140, the rear guiding surface 207 guides the next page 206 onto the rear support surface 110A. The next page 206 thus becomes the new turned page 202. To continue scanning the volume, one embodiment returns the volume to the initial scanning location on the front support surface 105A, 105B. To return the volume to the initial position, the volume may be lifted from the apparatus 100 and returned to the initial scanning position while preserving the page positions. Alternatively, in one embodiment the volume is slid along the apparatus 100 from the rear portion over the channel 140 to the initial scanning position on the front portion.

In one embodiment, an entrance return surface 240 allows the trailing edge 204 of the next page 206 to slide from the rear support surface 110A, back over the channel 140 and onto the front support surface 105A without entering the channel 140. In practice, the trailing edge 204 may droop into the channel 140 and snag on the return edge 250 of the entrance return surface 240 as the volume moves over the channel 140. In one embodiment, to prevent snags, entrance return surface geometry 235 angles the entrance return surface 240 inward at a junction 245 with the front support surface 105A to position the entrance return edge 250 under the trailing edge 204. For example, FIG. 2 illustrates the entrance return edge 250 positioned inward of the plane of the front and rear support surfaces 105A, 110A. If the position of the entrance return edge 250 exceeds the maximum droop of the trailing edge 204, the next page 206 slides onto the front support surface 105A as the volume moves over the channel 140 toward the front portion of the apparatus 100.

Additionally, some embodiments of the entrance return surface geometry 235 position the entrance return edge 250 at an angle relative to the apex 125 to gradually guide the next page 206 onto the front support surface 105A. For example, FIG. 2 illustrates the entrance return edge 250 sloping gradually down from the apex 125 towards the base 101 at the front of the apparatus 100. The gradual negative slope can reduce the effect of page droop (and thus the inward angle of the entrance return surface 240) as the trailing edge 204 first encounters the entrance return edge 250 near the apex 125 where page droop is at a minimum.

Channel Exit Side View

Figure 3:
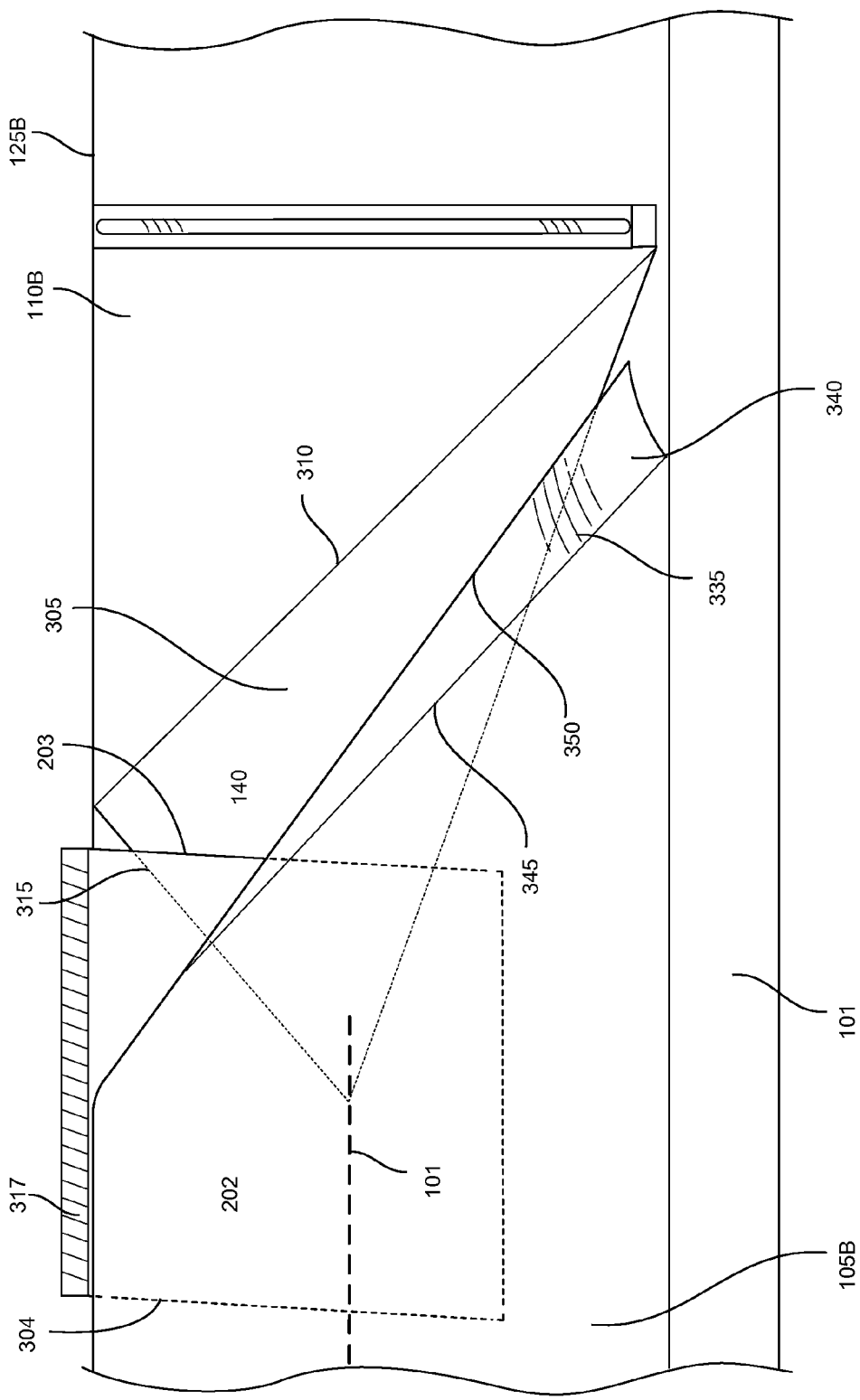
FIG. 3 is a schematic diagram illustrating a side view of the exit of the page turning channel according to one embodiment.

FIG. 3 is a schematic diagram illustrating a side view of the exit of the page turning channel 140 according to one embodiment. The channel exit is on the side of the apparatus 100 opposite the side with the channel entrance illustrated in FIG. 2. Some elements of the apparatus 100 are omitted in FIG. 3 for clarity.

As described above, the turned page 202 enters the channel 140 as the volume moves from the front to the rear portion of the apparatus 100. Inside the channel 140, the leading edge 203 of the turned page 202 encounters the exit surface 305. The exit surface 305 guides the leading edge 203 of the turned page 202 out of the channel 140 and into a position where the backside of the turned page faces the rear support surface 110B. The exit surface 305 has a junction 315 with the backside of rear support surface 110A that extends from the apex of the rear portion 125B to the base 101. The junction 315 prevents the leading edge 203 from snagging on the exit surface 305 within the channel 140.

Additionally, the exit surface 305 has a junction 310 with the rear support surface 110B that extends from the rear apex 125B to the base 101. In one embodiment, the junction 310 angles back, from where it meets with the rear apex 125B, towards the rear of the base 101. Thus, as the volume moves towards the rear of the apparatus 100, the exit surface 305 guides the portion of the leading edge 203 of the turned page 202 closest to the spine 317 into position on the rear support surface 110B first. Guiding the leading edge 203 in this manner immediately supports the turned page 202 near the spine 317 and closely matches the leading edge 203 of the turned page 202 with the leading edge of a previous page. Matching the leading edges one-to-one mitigates folding of the turned page 202 and stresses along the leading edge 203 of the turned page and the binding of the turned page 202 with the spine 317. Mitigating these stresses prevents tearing or creasing of the leading edge 203 of the turned page 202 or separation of the turned page 202 from the spine 317.

Furthermore, embodiments of the channel exit include an exit return surface 340 joined with the front support surface 110B that allow the trailing edge 304 of the turned page 202 to slide from the rear support surface, back over the channel 140 and onto the front support surface 105B during repositioning of the volume for additional scanning. In practice, the trailing edge 304 of the turned page 202 may droop into the channel 140 and snag on the exit return edge 350 of the exit return surface 340. To prevent snags, exit return surface geometry 335 angles the exit return surface 340 inward at junction 345 with the front support surface 105B. For example, FIG. 3 illustrates the exit return edge 350 positioned inward of the plane of the front and rear support surfaces 105B, 110B. If the position of the exit return edge 350 exceeds the maximum droop of the trailing edge 304, the turned page 202 slides onto the front support surface 105B as the volume moves over the channel 140 toward the front portion of the apparatus 100.

Separation Edge Internals

Figure 4:
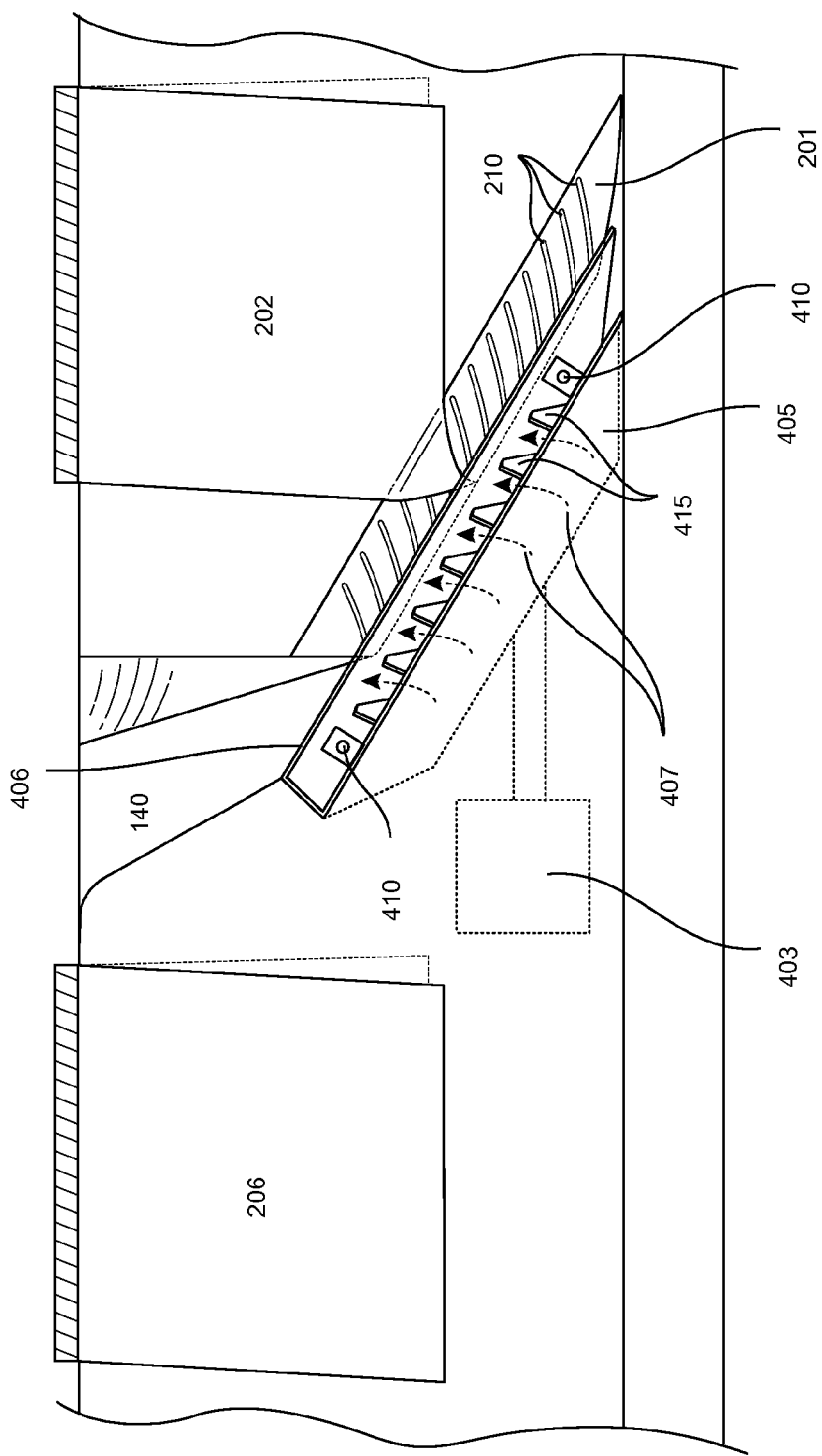
FIG. 4 is a schematic diagram illustrating a side view of the channel entrance with exposed separation edge internals according to one embodiment.

FIG. 4 is a schematic diagram illustrating a side view of the channel entrance with exposed separation edge internals according to one embodiment. Some elements of the apparatus 100 are omitted for clarity. FIG. 4 illustrates the apparatus 100 having a chamber 405 underneath the rear guiding surface 207 for aiding in the separation of the next page 206 from the turned page 202. A blower 403 blows air through the chamber 405 toward the channel entrance.

The chamber 405 includes vanes 415 to direct airflow and mounts 410 for the rear guiding surface 207 (not shown). The mounts 410 join the guiding surface 207 with rear support surface 115 at junction 220. In one embodiment, the mounts 410 are aligned to position the separation edge 225 (not shown) of rear guiding surface 207 according to the previously described surface geometry 230 (not shown) of that surface. A gap between the chamber exit 406 and the separation edge 225 allows air to flow 407 from underneath the rear guiding surface 207 and out of the channel 140 entrance. The vanes 415 evenly disperse airflow 407 from the blower 403 along the separation edge 225 and direct the air out of the channel 140, buffeting the next page 206. Buffeting the page with air "flutters" the leading edges and increases the likelihood of successfully separating the turned page 202 from the next page 206. In addition, the airflow 407 pushes the next page 206 away from the channel 140 entrance to combat page droop. In some embodiments, the blower's 403 inlet is connected to the vacuum chamber behind the front guiding surface 201 to create the pressure differential with the outside environment. The blower 403 "sucks" air through the perforations 210 and blows the air 407 out of the chamber exit 406.

Pipelining Scanner

Figure 5:
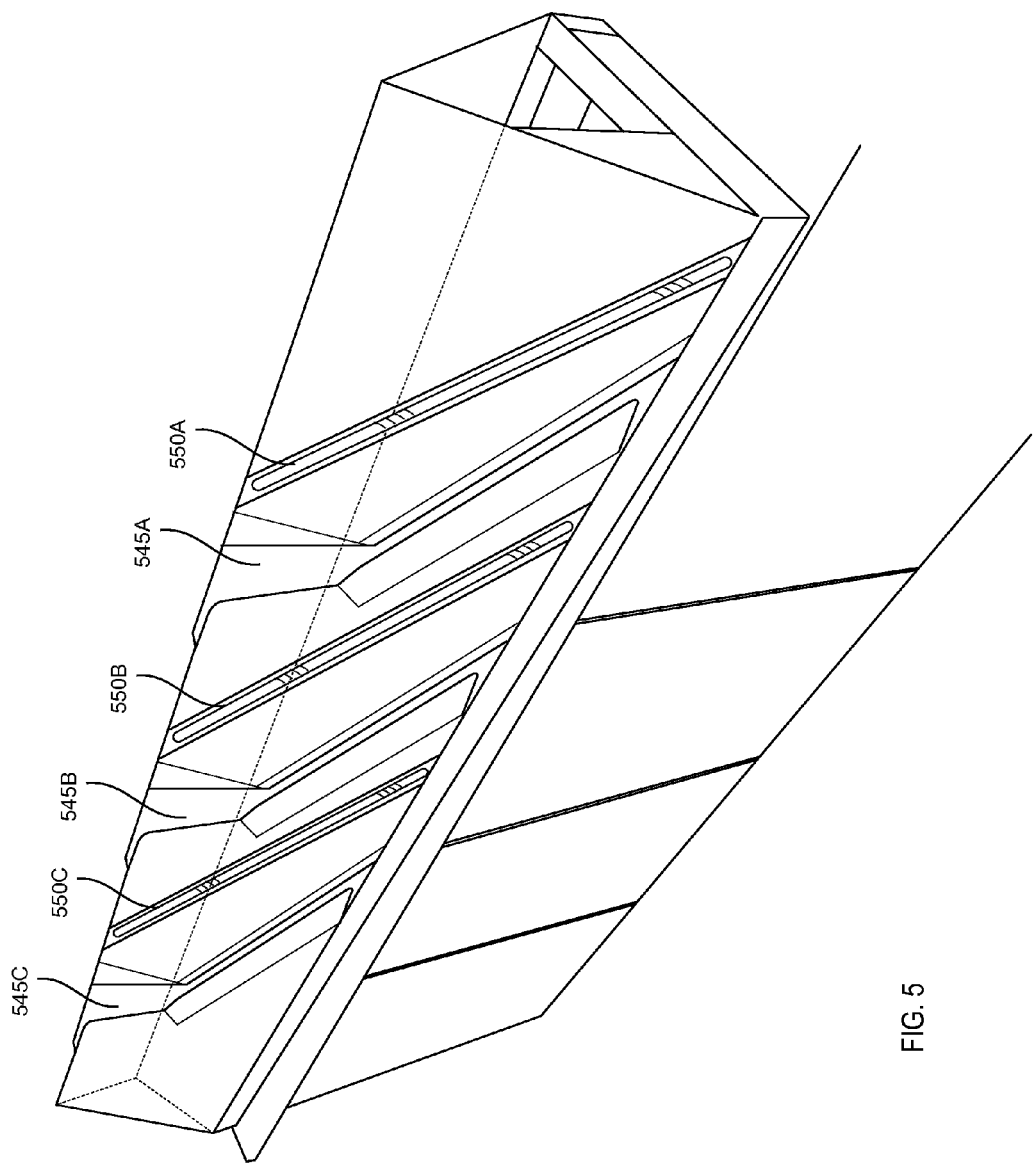
FIG. 5 is a schematic diagram illustrating a pipelining version of the apparatus according to one embodiment.

FIG. 5 is a schematic diagram illustrating a pipelining version of the apparatus 100 that can scan multiple pages of volumes, and multiple volumes, concurrently. Some elements of the apparatus 100 are omitted for clarity. FIG. 5 illustrates the channel entrance side of the apparatus 100 having multiple page turning channels 545 (e.g., 545A, 545B and 545C, as depicted in FIG. 5) and multiple scanning devices 550 (e.g., 550A, 550B and 550C, as depicted in FIG. 5) arranged in a linear configuration. While only the scanning devices 550 on the channel entrance side are illustrated, each scanning device is paired with a scanning device (not shown) on the opposite side of the apparatus 100.

In the pipelining version of the apparatus 100, the multiple page turning channels 545 turn multiple pages of the volume as it moves from the front toward the rear portion of the apparatus 100. FIG. 5 illustrates three page turning channels 545A, 545B, 545C and therefore turns three pages of the volume during a single pass along the apparatus 100. Because the apparatus 100 turns three pages, each side features three scanning devices to capture images of sides of the three turned pages produced by the page turns. Thus, the channel entrance side includes three scanning devices 550A, 550B, 550C which respectively scan the sides of the pages turned by the page turning channels 545A, 545B, 545C. Paired scanning devices on the other side of the apparatus 100 (not shown) scan the opposite sides of the pages. Thus, a total of 6 page sides are scanned during a single pass of a volume along the apparatus 100. By adding additional page turning channels and scanning devices, any number of pages may be scanned during a single pass of a volume. In addition, multiple volumes may be scanned by simultaneously moving the volumes along the apparatus 100 in serial order.

In addition, some embodiments of the pipelining version of the apparatus 100 scan volumes in a continuous fashion. For example, the apparatus 100 is configured such that one end of the apparatus curves back around and meets the other end to form a donut shape. The apparatus 100 may be circular, oval or rectangular. Thus, as the volume moves along the apparatus 100, page turning channels continually turn pages of the volume and scanning devices scan sides of the turned pages throughout each pass around the apparatus. Other embodiments may move the apparatus relative to the volumes. In one embodiment, page turning channels and scanners are positioned evenly along the apparatus 100. Other embodiments of the apparatus 100, such as those that are rectangular, may omit page turning channels and scanning devices at extreme curvature points to prevent sub-optimal scanning.

In some embodiments, the pipelining version of the apparatus 100 includes scanning devices positioned diagonally on the apparatus 100 to maximize the number of pages turned per length of apparatus 100. For example, FIG. 5 shows scanning devices 550A, 550B, 550C in diagonal positions on the channel 140 entrance side. With the scanning devices 550 in diagonal positions, the distance between channel entrances 545 may be decreased compared to configurations using scanning devices in vertical positions. Consequently, the distance between the channels' 545 exits (not shown) is also decreased. Accordingly, the scanning devices opposite (not shown) to 550A, 550B, 550C may also be positioned diagonally between the channels' 545 exits (not shown) to account for the decrease in distance.

Additionally, in some embodiments, a cradle or trough supports volumes at an open angle approximate to the angle formed at the apex 125. The apparatus 100 is oriented upside-down relative to its depiction in FIG. 1 or 5, for example, and positioned over the volume such that support surfaces 105, 110 are contacting the page sides of the open volume. Because page sides still contact the support surfaces 105, 110, moving the apparatus or volume will cause a forward scanning device to scan the first side of the page, perforations to hold the turned page against a front guiding surface, which guides the turned page into a channel, and a rear scanning device to scan the second page side.

Automated Scanning

Figure 6:
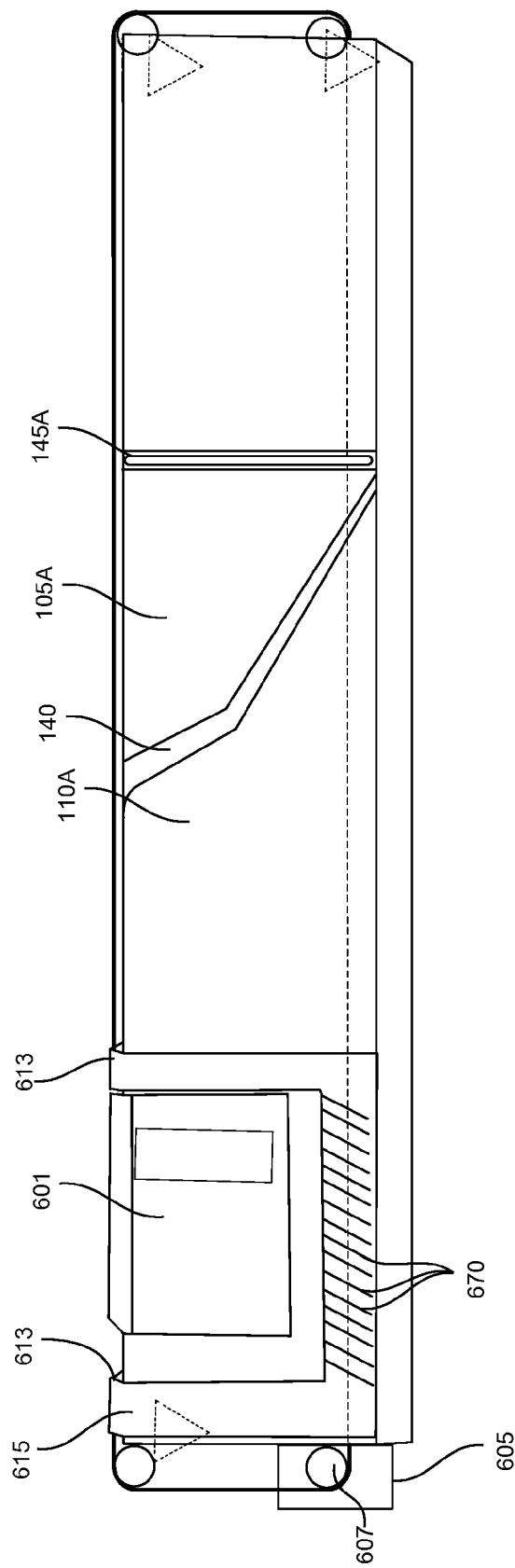
FIG. 6 is a schematic diagram illustrating a side view of the apparatus and showing an automated system for moving a volume according to one embodiment.

FIG. 6 is a schematic diagram illustrating a side view of the apparatus 100 and showing an automated system for moving the volume 601 according to one embodiment. Some elements of the apparatus 100 are omitted for clarity. FIG. 6 illustrates a motor 605 connected to a drive system 607 driving a saddle 615 for moving the volume 601 along the apparatus 100.

In one embodiment, the saddle 615 is rectangular and includes a set of hinges that allow the sides of the saddle 615 to lay flat on the support surfaces 105, 110 of the apparatus 100 when the saddle apex 613 is aligned with the apex 125. In some embodiments, hinges at the saddle apex 613 are fixed or molded such that the angle of the saddle apex 613 formed by the saddle sides 615 is equal to or slightly greater than the angle formed by the support surfaces 105, 110. Additionally, the portion of the saddle apex 613 that rides on apex 125 may be constructed out of a non-abrasive material with a low coefficient of friction. For example, the saddle 615 may include a high-density polyethylene insert fastened to the undersides of the saddle apex 613 that rides on the apex 125. Thus, the angle of the saddle apex 613 and construction of the saddle apex 613 may be varied to reduce friction between the saddle 615 and the support surfaces 105, 110.

The interior of the rectangle forming the saddle 615 has a cut-out area which forms a frame into which the volume 601 is inserted. In one embodiment, the saddle 615 is constructed from lightweight plastic and is thick enough to prevent it from sliding underneath the pages of the volume 601. For example, the thickness of the interior of the saddle 615 may be approximately the volume's total thickness to maintain contact with the volume's cover as the saddle is driven.

The motor 605 powers the drive system 607 which drives the saddle 615 linearly along the apparatus 100 and therefore also drives the volume 601 held within the saddle. In one embodiment, the drive system 607 uses a belt attached at both ends of the saddle 615 that can move the saddle 615 bi-directionally, thereby allowing the volume 601 to move forward and backward along the apparatus 100. The page turning channel 140 turns the pages of the volume while the scanning devices 145 collect image data.

Some embodiments of the saddle 615 include a registration pattern 670 that enables the computer 190 to register the images of scanned pages. The scanning devices 145 scan the registration pattern 670 coincident with scanning the pages. The registration pattern 670, like a scanned page image, may distort if the speed of the volume 601 varies while the page passes over a scanning device 145. Likewise, other interactions of the page with the apparatus may cause other distortions in the page image. Since the registration pattern 670 is known, the computer 190 can use the registration pattern 670 to correct for the distortions in the scanned page images. Furthermore, some embodiments of the saddle 615 include a coating or surface for calibrating scanning devices prior to or coincident with a page scanning operation. In one embodiment, the computer 190 initiates a calibration operation as the drive system 607 positions a calibration surface over a scanning device. Scanning device calibration may be performed, for example, prior to scanning a volume, every 30 minutes or after a given number of page scans.

In some embodiments, the drive system 607 includes a tensioner and belts with teeth that mesh together. Other embodiments use a combination of tension and toothless belts, gears and chains or another drive system. For example, the saddle 615 can be attached to a track above the apparatus and moved along the track. In some embodiments, the saddle 615 is stationary and the apparatus is moved relative to the saddle.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A linear scanner for scanning a page of a bound volume, comprising:
    a front portion having first and second front support surfaces adapted to support the volume as the volume moves along the linear scanner;
    a front guiding surface joined with the first front support surface and disposed to guide the page of the volume into a page turning channel within the linear scanner as the volume moves along the linear scanner;
    a rear portion having first and second rear support surfaces respectively aligned with the first and second front support surfaces and disposed to support the volume as the volume moves along the linear scanner;
    an exit surface joined with the second rear support surface and disposed to guide the page of the volume out of the page turning channel and onto the second rear support surface as the volume moves along the linear scanner; and
    first and second scanning devices respectively disposed on one of the first support surfaces and one of the second support surfaces and adapted to digitally scan the page of the volume as the volume moves along the linear scanner.

2. The linear scanner of claim 1, wherein the first scanning device is disposed on the first front support surface and scans a first side of the page and the second scanning device is disposed on the second rear support surface and scans a second side of the page.

3. The linear scanner of claim 1, wherein the front and rear support surfaces form a triangular prism having a linear apex disposed to support a spine of the volume as the volume moves along the linear scanner.

4. The linear scanner of claim 3, wherein the exit surface is joined with the second rear support surface at a junction that extends from the linear apex toward the rear of the linear scanner and is disposed to guide a portion of a leading edge of the page near a binding of the volume to the second side of the rear support surface.

5. The linear scanner of claim 1, wherein the front guiding surface is curved inward toward the page turning channel within the linear scanner and includes perforations configured to use negative air pressure to hold the page of the volume close to the front guiding surface and separate the page from another page of the volume.

6. The linear scanner of claim 1, further comprising:
a rear guiding surface joined with the first rear support surface and extending toward the front guiding surface and disposed to encounter another page of the volume as the volume moves along the linear scanner and guide the other page onto the first rear support surface and isolate the page in the channel.

7. The linear scanner of claim 6, wherein the rear guiding surface is bent inward toward the front guiding surface and includes vanes configured to direct positive air pressure at pages of the volume.

8. The linear scanner of claim 1, further comprising:
an exit return surface joined with the second front support surface and angled into the page turning channel to prevent the page of the volume from entering the page turning channel as the volume moves along the linear scanner from the rear portion toward the front portion.

9. The linear scanner of claim 1, further comprising:
an entrance return surface joined with the first front support surface and angled into the page turning channel to prevent another page of the volume from entering the page turning channel as the volume moves along the linear scanner from the rear portion toward the front portion.

10. A method of scanning a page of a bound volume using a linear scanner, comprising:
moving the volume along a front portion of the linear scanner having first and second front support surfaces to cause the page to encounter a front guiding surface joined with the first front support surface which guides the page of the volume into a page turning channel within the linear scanner; and
moving the volume along the front portion past the channel to a rear portion of the linear scanner having first and second rear support surfaces respectively aligned with the first and second front support surfaces to cause the page to encounter an exit surface joined with the second rear support surface which guides the page out of the page turning channel and onto the second rear support surface,
wherein moving the volume along the linear scanner causes the page to encounter first and second digital scanning devices respectively disposed on one of the first support surfaces and one of the second support surfaces.

11. The method of claim 10, wherein moving the volume along the front portion of the linear scanner causes a first side of the page to encounter the first digital scanning device, the first digital scanning device disposed on the first front support surface and wherein moving the volume on the rear portion of the linear scanner causes a second side of the page to encounter the second digital scanning device, the second digital scanning device disposed on the second rear support surface.

12. The method of claim 10, wherein the front and rear support surfaces form a triangular prism having a linear apex disposed to support a spine of the volume as the volume moves along the linear scanner.

13. The method claim 12, wherein the exit surface is joined with the second rear support surface at a junction that extends from the linear apex toward the rear of the linear scanner and is disposed to guide a portion of a leading edge of the page near a binding of the volume to the second side of the rear support surface.

14. The method of claim 10, wherein the front guiding surface is curved inward toward the page turning channel within the linear scanner and includes perforations configured to use negative air pressure to hold the page of the volume close to the front guiding surface and separate the page from another page of the volume.

15. The method of claim 10, wherein moving the volume along the front portion past the front digital scanning device further comprises causing another page of the volume to encounter a rear guiding surface joined with the first rear support surface and extending toward the front guiding surface which guides the other page onto the first rear support surface and isolates the page in the channel.

16. The method of claim 15, wherein the rear guiding surface is bent inward toward the front guiding surface and includes vanes configured to direct positive air pressure at pages of the volume.

17. The method of claim 10, further comprising:
moving the volume along the rear portion past the channel to the front portion to cause the page to encounter an exit return surface joined with the second front support surface and angled into the page turning channel which guides the page onto the second front support surface.

18. The method of claim 10, further comprising:
moving the volume along the rear portion past the channel to the front portion to cause the other page to encounter an entrance return surface joined with the first front support surface and angled into the page turning channel which guides the other page onto the first front support surface.

19. A linear scanner for scanning a page of a bound volume, comprising:
a front portion having first and second front support means for supporting the volume as the volume moves along the linear scanner;
front guiding means for guiding the page of the volume into a page turning channel within the linear scanner as the volume moves along the linear scanner;
a rear portion having first and second rear support means respectively aligned with the first and second front support means for supporting the volume as the volume moves along the linear scanner;
exit means for guiding the page of the volume out of the page turning channel and onto the second rear support means as the volume moves along the linear scanner; and
first and second scanning means respectively disposed on one of the first support means and one of the second support means for digitally scanning the page of the volume as the volume moves along the linear scanner.

20. The linear scanner of claim 19, wherein the first scanning means is disposed on the first front support means and scans a first side of the page and the second scanning means is disposed on the second rear support means and scans a second side of the page.

21. The linear scanner of claim 19, wherein the front and rear support means include binding support means for supporting a spine of the volume as the volume moves along the linear scanner.

22. The linear scanner of claim 19, wherein the exit means includes means for guiding a portion of a leading edge of the page near a binding of the volume to the second side of the rear support surface.

23. The linear scanner of claim 19, wherein the front guiding means include page holding means for holding the page of the volume close to the front guiding means and separating the page from another page of the volume.

24. The linear scanner of claim 19, further comprising:
rear guiding means for guiding another page of the volume onto the first rear support surface and isolating the page in the channel.

25. The linear scanner of claim 24, wherein the rear guiding means includes means to direct positive air pressure at pages of the volume.

26. The linear scanner of claim 19, further comprising:
exit return means for preventing the page of the volume from entering the page turning channel as the volume moves along the linear scanner from the rear portion toward the front portion.

27. The linear scanner of claim 19, further comprising:
entrance return means for preventing another page of the volume from entering the page turning channel as the volume moves along the linear scanner from the rear portion toward the front portion.

\* \* \* \* \*